Sept. 12, 1961     J. O. JOHNSON, JR     2,999,384
ZERO ADJUSTING APPARATUS
Filed Sept. 9, 1957
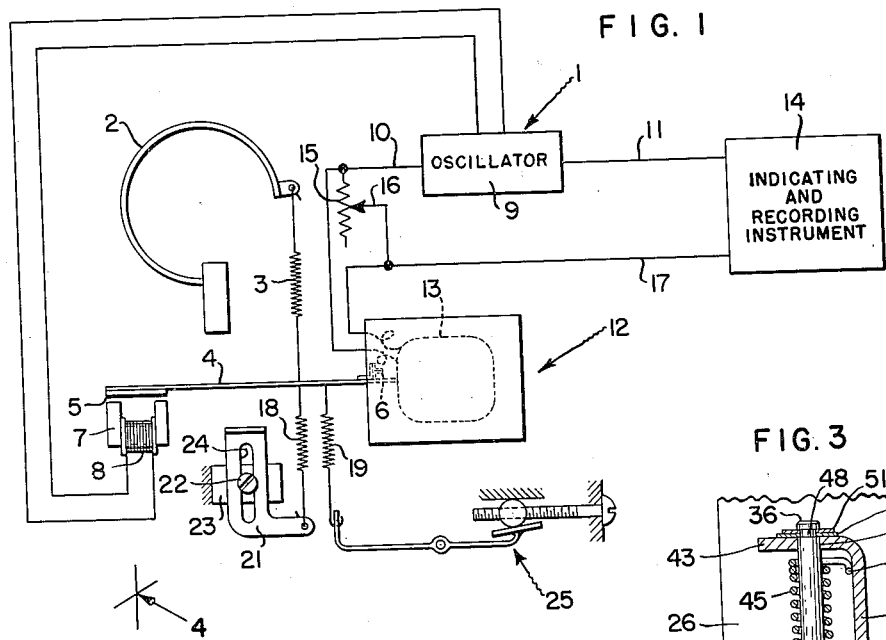
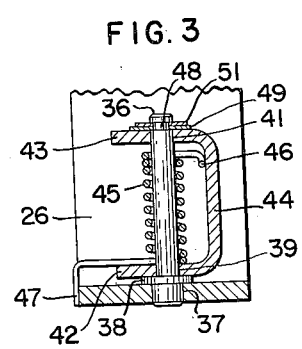
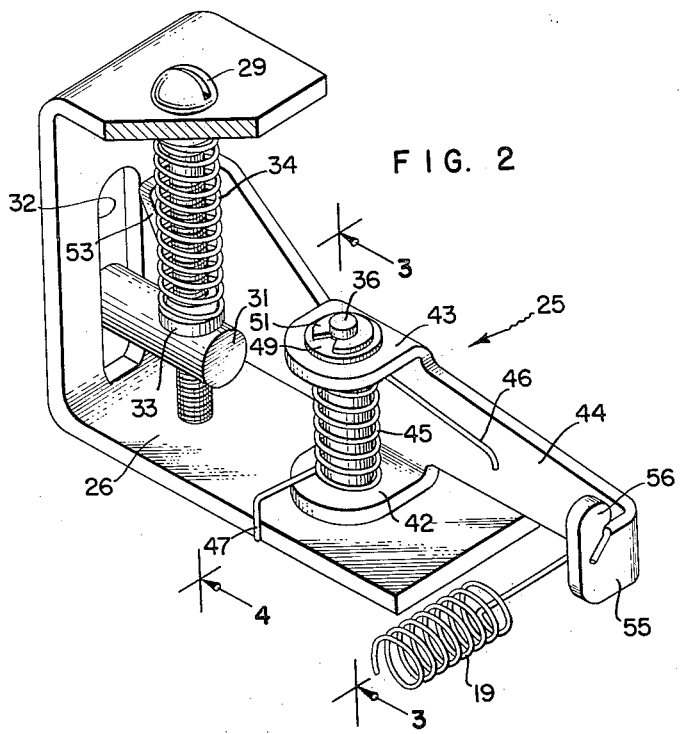
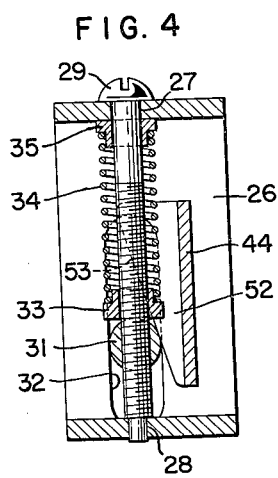
INVENTOR.
JUSTIN O. JOHNSON JR.
BY *Arthur N. Swanson*
ATTORNEY.

United States Patent Office 2,999,384
Patented Sept. 12, 1961

2,999,384
ZERO ADJUSTING APPARATUS
Justin O. Johnson, Jr., Levittown, Pa., assignor to Minneapolis-Honeywell Regulator Company, Minneapolis, Minn., a corporation of Delaware
Filed Sept. 9, 1957, Ser. No. 682,862
10 Claims. (Cl. 73—393)

An object of the present invention is to provide a new and improved fine zero adjusting apparatus for an enclosed pressure to current displacement type of transducer which apparatus contains parts that do not have to be manufactured with a fine degree of accuracy and which at the same time will afford a very fine zero adjustment.

Still another object of the present invention is to provide a fine zero adjusting apparatus for the general type of displacement transducer as that disclosed in the Philip E. Scheaffer patent application, Serial 433,505, filed June 1, 1954, now Patent No. 2,847,619, entitled Electrical Apparatus.

A still more specific object of the present invention is to provide a zero adjusting apparatus that comprises a screw adjusted-cam actuated lever to vary the tension that a spring is permitted to apply to the aforementioned transducer.

Still another specific object of the invention is to provide a screw adjusted cam actuated lever of the aforementioned type to adjust the zero position of a transducer wherein screw adjustments made in a vertical direction apply varying amounts of tension to a coil spring that has its longitudinal axis normal to the vertical axis of the screw.

Another object of the present invention is to provide a spring tensioning means to adjust the zero setting of the aforementioned type of displacement transducer whose increase in stiffness, due to ambient temperature changes, will not adversely affect the zero setting of such a transducer.

Another object of the present invention is to disclose how the selection of certain characterized span adjusting and zero adjusting springs may be made for a displacement transducer which springs will not be adversely affected by the aforementioned change in stiffness due to ambient temperature changes.

Experimentation has shown that ambient temperature compensating bi-metal bonderized elements are not necessary if the aforementioned span spring possesses the same rate of stiffness change with ambient temperature changes that the Bourdon tube possesses. This selected spring and tube arrangement will negate any force change due to any ambient temperature variation.

Experimentation has also shown that if the span adjusting spring being used in a force balance instrument has a zero force which is initially greater than that which the zero adjusting spring possess by a ratio that is equal to the rate of stiffness change occurring in the zero spring divided by the rate of stiffness change occurring in the span spring then the zero shift due to initial tension in the span spring can be eliminated.

It is therefore another object of the present invention to disclose how span and zero adjusting springs which are completely compensated for ambient temperature changes may be used as a zero adjusting apparatus for a force balance instrument.

A better understanding of the present invention may be had from the following detailed description when read in connection with the accompanying drawing in which:

FIG. 1 schematically shows how the zero adjusting apparatus disclosed in this application may be connected to a displacement transducer that is being used in a force balance system;

FIG. 2 shows an assembly of the parts of the zero adjusting apparatus;

FIG. 3 shows a cross sectional view taken along the lines 3—3 shown in FIG. 2 and FIG. 4 shows a cross sectional view taken along the lines 4—4 shown in FIG. 2.

FIG. 1 of the drawing shows a schematic form of a pressure to current force balance system 1 having a displaceable transducer to which the zero adjusting apparatus disclosed in the application may be attached.

This force balance system is however, representative of numerous types of measuring apparatus that employs the principle of using a variable to produce a reaction force upon a pivoted beam with the force being balanced by a force derived from a suitable feedback force producing device.

The system shown in FIG. 1 may, for example employ a force balance displaceable transducer similar to the type disclosed in the Philip E. Scheaffer application, Serial No. 433,505, filed June 1, 1954, now Patent No. 2,847,619.

The force balance system 1 shown in FIG. 1 is comprised of a Bourdon tube 2 to the interior of which a fluid pressure of a varying magnitude is applied to displace the free end of the Bourdon in an upward or downward direction. FIG. 1 also shows a span spring 3 through which a force can be applied to a pivoted beam 4 which force is directly proportional to any change in pressure that occurs within the Bourdon 2. The resulting deflection of the beam 4 causes the plate 5 attached thereto to be rotated about a torsional angle pivot 6 relative to an iron core 7 that has a coil 8 wound thereon. The coil 8 is used to vary the impedance of the feedback path of the oscillator 9, which has the coil on the input thereof and this coil 8 controls the amplitude of the oscillations and the D.C. current output. The magnitude of output current of the oscillator 9 is proportional to the motion of the member 5 relative to the coil 8. Its output current flowing in leads 10 and 11 will be proportional to the magnitude of the pressure in the Bourdon tube. The output current flow is used to force balance the pivoted beam 4 by means of a force balancing unit 12. This unit includes a coil 13 surrounded by permanent magnet units, not shown, for creating a magnetic field as is disclosed in detail in the aforementioned Scheaffer patent application. This unit 12 utilizes the coil 13 that is attached to one end of the beam as a means for force balancing the beam. The output current flows to a suitable indicating and recording instrument shown generally as 14.

In considering the operation of the force balance apparatus of FIG. 1 it will be noted that with a particular fluid pressure in the Bourdon tube there will be a predetermined force applied through the spring 3 to displace the pivoted beam 4 and member 5 fixedly attached thereto. This displacement of the beam 4 and the member 5 is detected by the coil 8 and the oscillator 9 will have an output current proportional to this deflection. The output current of the oscillator 9 will pass through the force balancing pancake shaped coil 13 of the unit 12 which, acting directly on the right end of the beam 4, will provide a balancing force for this beam 4 so that the resultant current flow in the output leads 10 and 11 passing into the indicating instrument 14 will be proportional to the magnitude of the fluid pressure in the Bourdon 2.

From the above description of the forces acting on the beam 4 it should thus be readily apparent that the position that the member 5 will be located in at any one instant of time will be determined by the difference that is then present between the force of spring 3 acting on the beam 4 due to the displacement of Bourdon 2 less the amount of this force that is bucked out by the force balancing current acting on the pancake coil 13.

The characteristics of the unit 12 is such that it will produce a high output torque through a relatively small angle and thus provide a high balancing force for the pivoted beam 4 while the actual motion of the beam is very small.

The force balance system shown in FIG. 1 may also include a span adjusting means in the form of a suitable potentiometer 15 and a slider 16 shown located between the electrical leads 10 and 17. The potentiometer and slider may be used to adjust the span of the aforementioned described force balance unit in the same manner as that disclosed in the Modie application Serial No. 487,882 filed Feb. 14, 1955, now Patent No. 2,950,054.

As has been previously noted the present invention is concerned with the provision of a zero adjusting apparatus for the aforementioned type of force balance system shown in FIG. 1 whose spring components are so constructed that changes in ambient temperature will not cause them to introduce any undesirable shift in the zero position of the instrument in which they are being used. The zero position of the instrument shown in FIG. 1, for example, is the position that the beam 4 will be in when its longitudinal axis is in a horizontal plane and there is no deflection of the Bourdon 2, nor any force being applied by the span spring 3 to the beam 4.

To this end there is shown in FIG. 1 of the drawing the springs 18, 19. The total zeroing force that these springs apply to the beam is used to adjust the beam 4 in its zero or horizontal position as will hereafter be described. The force that the spring 18 will apply to the beam is governed by the position to which its lower end has been moved by the L-shaped member 21. By loosening the screw 22 that is threadedly connected to the stationary member 23 the member 21 may be moved in either an upward or downward direction to decrease or increase the tension on the spring 18. The screw 22 may then be again screwed into a tight position against the vertical wall portion of the member 21 that contains the slot 24.

The force that the spring 19 will apply to the beam 4 is governed by the position to which the hereinafter to be described cam actuated lever-zero adjusting apparatus 25 has been moved.

A general arrangement showing the various components of this zero adjusting apparatus 25 is disclosed in FIG. 2 of the drawing. This zero adjusting apparatus is comprised of a J-shaped stationary bracket 26 that has apertures 27, 28 for retaining the upper and lower end portions of a screw member 29 that passes therethrough in line with one another. Surrounding the lower end portion of this screw and threadedly mounted thereon there is shown one end of a stud member 31. The other end of this stud member 31 projects through a vertical slotted portion 32 that is formed by a wall portion of the bracket 26. The amount of clearance that is present between the diameter of the stud and the width of the slot is only the amount that is necessary to permit the stud to be moved in an upward or downward direction in the slot as the screw is rotated in either a clockwise or counterclockwise direction.

Riding on the top of the upper portion of the stud 31 and spaced from the outer surface of the screw 29 there is shown an embossed sleeve 33 for retaining the lower end of the coil spring 34. FIG. 4 of the drawing shows the upper end of the spring 34 retained by a second embossed sleeve 35 which is spaced from the outer surface of the screw 29 and which may be fixedly connected to the inner surface of the stationary bracket 26.

FIG. 3 of the drawing shows how the lower end of a pivot pin 36 may be fixedly attached to the lower portion of the bracket 26 by press-fitting its lower end portion into the aperture 37 until the lower surface of the cylindrical part 38, that is an integral portion of the pin 36, is forced against the flat lower surface of the J-shaped plate 26.

FIG. 3 shows this pin 36 passing in an upward direction through two apertures 39, 41 cut in the lug portion 42, 43 of a cam lever 44. Between the portions 42, 43 and spaced from the outer surface of the pin 36 there is shown a coil spring 45 that has an upper end 46 and a lower end 47 each in contact with a cam lever 44 and bracket as is disclosed in FIGS. 2 and 3. Above the upper surface of the lug 43 there is shown a groove 48 that is surrounded by a washer 49 and whose outer surface is engaged by a retaining clip 51.

As can best be seen in FIGS. 2 and 4 of the drawing the left end of the cam lever 44 contains a lug portion 52 that has a sloping cam surface 53 which is retained in contact with the outside surface of the stud 31.

The right end of the cam lever 44 also contains a lug portion 55 that has an upward and rearwardly extending portion 56 around which one end of a spring 19 may be retained.

It will be readily understood from the aforementioned description of the cam actuated lever-zero adjusting apparatus 25 that if the screw 29 is turned in one direction from the position shown, the stud 31 will be moved further in a downward direction. As this rotation of the screw 29 is taking place, the force of the spring 45 will be permitted to be continually applied through its end portion 46 to the cam lever 44 to rotate the cam lever about the pivot pin 36 in a counterclockwise direction so that a greater force may be applied to the beam 4 by applying a greater tension to the end of the spring 19.

In a similar but reversed manner when the screw 29 is turned in the opposite direction to that noted supra the stud 31 will be moved from the position shown in the drawing in an upward direction. As this rotation takes place the cam lever 44 will be rotated in a clockwise direction about the pivot pin 36 against the bias of the spring 45 so that a smaller amount of force may be applied to the beam 4 by lessening the tension that was previously present on the spring 19.

It can thus be seen that this cam actuated lever-zero adjusting apparatus 25 will permit the vertical screw 29 to be rotated a large number of turns and cause only a small amount of force to be applied through a horizontally located spring 19 to a beam 4. In other words the apparatus permits a large rotary adjustment to be made along one central axis, such as the central axis shown for the screw 29, which will result in a very small change in tension that is being applied to the end of the spring, such as the spring 19, that has its axis normal to the vertical axis of the screw.

Experimentation has shown that when the Bourdon tube is in a position in which it is applying no force by way of the span spring 3 to the beam and a change in the ambient temperature occurs, a simultaneous change in the stiffness of the tube 2, and the untensioned span spring 3 will also take place due to their respective thermo-elastic coefficients. This change in stiffness in the Bourdon tube 2 and span spring 3 will for example cause an undesirable force to be applied to the beam 4. When such an undesirable force occurs there will be a force introduced at the pivot 6 which will cause the zero or horizontal longitudinal axis of the beam 4 to be shifted.

Experimentation has shown that if the material used to make the Bourdon tube and the material used to make the span spring 3 is matched in such a manner that their thermo-elastic coefficients are the same, then as the aforementioned ambient temperature change takes place the aforementioned undesirable force being applied to the beam will be negated.

Experiment has shown in this regard that if Bourdon tube 2 is made of a 4130 carbon steel and the spring 3 is made of a type 17–7 PH stainless steel whose respective thermo-elastic coefficients are closely equal then with changes in ambient temperature the aforementioned undesirable force will not be allowed to occur. In other words the materials that are elected for the Bourdon 2 and the spring 3 are such, that, as the movable end of the Bourdon 2 tends to stiffen or straighten out due to the change in ambient temperature the resulting force that would then normally be transmitted to the beam 4 by the spring 3 will be cancelled out or negated due to the expansion of spring 3 that simultaneously takes place with this ambient temperature change.

It can thus be seen that by employing the aforementioned type of Bourdon 2 and the span spring 3 in the force balance system shown in FIG. 1 of the drawing one can be assured that no change in the position of the beam will occur due to any change in ambient temperature of the Bourdon 2 and the spring 3.

It is first necessary to select a suitable ambient temperature compensating material for the aforementioned Bourdon and span spring 3 for the condition in which these components are applying no force to the beam 4. It is then necessary to select a suitable material for the coarse spring 18 which will negate any undesirable stiffening of the Bourdon 2 and the span spring 3 that will occur due to changes in the ambient temperature while the force being transmitted to the beam by the action of these elements is raised from the aforementioned zero force value noted supra to some positive force value.

Experiment has further shown that this latter mentioned feat can be accomplished by matching the material that has been already selected for the span spring 3 with a material for the zero spring 18 in such a manner that the initial zeroing force $F_s$ selected for the span spring 3 will be greater than the selected zeroing force $F_z$ of the zero spring 18 by the ratio of the thermoelastic coefficient $B_z$ of the zero spring divided by the thermoelastic coefficient $B_s$ of the span spring so that when a feedback force $F_m$ from the pancake coil 13 is introduced it will satisfy the following equation:

$$F_s = \frac{F_m}{1 - \frac{B_s}{B_z}}$$

wherein the feedback force $F_m$ equals the force $F_s$ of spring 3 less the zeroing force $F_z$ of spring 18. For effective compensation $B_z$ must be greater than $B_s$, otherwise the $F_s$ required approaches infinity and compensation is not possible.

If the previously mentioned type 17–7 PH stainless steel span spirng has a $B_s$, or thermoelastic coefficient of $-140 \times 10^{-6}$ per degree Fahrenheit and the zero spring is made of Elgiloy material having a $B_z$, or thermoelastic coefficient, of $-220 \times 10^{-6}$ per degree Fahrenheit the aforementioned equation is satisfied.

This equation thus shows that by using the aforementioned characterized springs that the zero shift of the beam 4 that would normally occur due to the stiffening effect that ambient temperature has on the span spring 3 when the force that this spring is transmitting to the beam is raised to some positive value, has now been negated.

Since the very fine spring 19 can apply only very minute force to beam 4 it cannot adversely affect the aforementioned joint ambient temperature compensating action of the coarse spring 18 and the span spring 3. Furthermore the joint compensating action of spring 18 and 19 can be considered as the single coarse spring 18 that has previously been described since the fine spring 19 can be made of the same material as this coarse spring It can thus be seen that the present invention not only discloses a means for altering the force that a zero adjusting apparatus can apply to the beam in a force balance system but also discloses certain types of springs which can be used in this apparatus which will not cause a shift in the beam to occur when changes in the ambient temperature of these spring take place.

What is claimed is:

1. An ambient temperature compensated fine zero adjusting apparatus for a force balance system comprising, a stationary bracket, a screw means having its longitudinal axis vertically positioned for rotation on said bracket, a stud threadedly mounted on said screw means at one end and protruding through a vertical slot in said bracket at its other end, a pivot pin having its longitudinal axis protruding in a vertical direction from said bracket, a cam lever pivotally mounted on said pivot pin, said lever having at one of its ends a protruding tapered portion in contact with the outer peripheral portion of said stud, a biasing means having one of its end fixedly connected to said bracket and another end in contact with said lever to retain said lever in contact with said stud and a lug connected to the other end of said lever to apply very small incremental increases in tension to a zero spring means when said screw is rotated in one direction and/or to apply very small incremental decreases in tension to said zero spring when said screw is rotated in the opposite direction.

2. An ambient temperature compensated zero adjusting means for an electrical instrument having a force balance beam, comprising a spring connected at one end to one side of said beam and at its other end to a means applying a variable input force through said spring to said beam, a zero adjusting spring connected at one end to a means which is adjustable with respect to this spring to vary the tension in said last mentioned spring and being connected at its other end to another second side of said beam and wherein said first mentioned spring is operably arranged to apply initially a greater force to said beam than the zero adjusting spring force that is applied by said zero spring by an amount that is equal to the thermoelastic coefficient of the zero spring divided by the thermoelastic coefficient of the first mentioned spring.

3. A means for completely compensating a zero adjusting apparatus for changes in ambient temperature, comprising a span spring of a preselected thermo-elastic coefficient having one of its ends connected to a pivoted force balance beam member in a force balance system and having its other end connected to a first means for applying a variable input force in one direction to said beam member, a zeroing spring of a thermo-elastic coefficient that is different than said first mentioned coefficient having one of its ends connected to said beam member and its other end connected to a second means which is adjustable with respect to said zeroing spring to apply a variable force in an opposite direction through said spring to said beam member, said characteristics of said two springs being such that upon a change in ambient temperature the resultant force being applied to said pivoted member due to said two forces will always be equal to the ratio that exists between the said thermo-elastic coefficient of said zeroing spring and the said thermo-elastic coefficient of the span spring multiplied by the said force that is being applied by the zeroing spring to said member.

4. A zero adjusting ambient temperature compensated apparatus as specified in claim 3 wherein said span spring is made of a type 17–7 PH stainless steel material having a thermo-elastic coefficient of $-140 \times 10^{-6}$ per degree Fahrenheit and wherein said zero spring is made of Elgiloy having a thermo-elastic coefficient of $-220 \times 10^{-6}$ per degree Fahrenheit.

5. A zero adjusting ambient temperature compensated apparatus as specified in claim 3 wherein a pressure actuated element is used to apply a tension to said span spring in accordance with changes in a variable pressure acting on said element and wherein said element is made of a material whose thermo-elastic coefficient is the same as the thermo-elastic coefficient of said span spring.

6. A zero adjusting ambient temperature compensated apparatus for an instrument having a force balance beam member, comprising a first spring operably connected at its respective opposite ends to said beam member and to a variable force applying means whereby a varying force is applied to said force balance beam member in one direction, a second spring, a means adjustable with respect to said second spring for applying a counter force through said second spring to said beam member in a direction that is opposite to the first mentioned force, said first spring being constructed to apply initially a greater force to said beam than said second spring by an amount that is equal to the quotient resulting from dividing the thermo-elastic coefficient of said second spring by the thermo-elastic coefficient of said first spring.

7. A zero adjusting ambient temperature compensated apparatus for an instrument having a force balance beam member, comprising a first coil spring operably connected at its respective opposite ends to said beam member and to a variable force applying means whereby a varying force is applied to said force balance beam member in one direction, a second coil spring, a means adjustable with respect to said second coil spring for applying a counter zeroing force through said second coil spring to said beam member in a direction that is opposite to said first mentioned force and wherein said first coil spring applies initially a greater force to said beam than said second spring by an amount that is equal to the quotient resulting from dividing the thermo-elastic coefficient of said second spring by the thermo-elastic coefficient of said first coil spring.

8. A means for completely compensating a zero adjusting apparatus for changes in ambient temperature, comprising a coiled span spring of a preselected thermo-elastic coefficient having one of its ends connected to a pivoted force balance beam member in a force balance system and having its other end connected to a first means for applying a variable input force in one direction to said beam member, a second coiled zeroing spring of a thermo-elastic coefficient that is different than said first mentioned coefficient having one of its ends connected to said beam member and its other end connected to a second means which is adjustable with respect to said coiled zeroing spring to apply a variable force in an opposite direction through said spring to said beam member, and said characteristics of said two coiled springs being such that the resultant force being applied by the other end of said pivoted member due to said two forces will always be equal to the ratio that exists between the thermo-elastic coefficient of said coiled span spring and the thermo-elastic coefficient of the coiled zeroing spring multiplied by the said force that is being applied by the coiled zeroing spring to said member.

9. An ambient temperature compensated zero adjusting apparatus for a displaceable pressure to current transducer having a displaceable arm, comprising a span spring connected at one end to one side of said arm and at its other end to a pressure actuated means applying a variable input force through said spring to said arm, a zero adjusting spring conected at one end to an opposite side of said arm, an adjustable means connected to the other end of said zero adjusting spring and being operably adjustable therewith to vary the tension in said last mentioned spring and wherein the initial force exerted by said span spring on said displaceable arm is greater than the initial force exerted by said zero adjusting spring by the ratio of the thermo-elastic coefficient of the zero adjusting spring divided by the thermo-elastic coefficient of the span spring.

10. A fine zero adjusting apparatus for use in an ambient temperature compensated means, comprising a stationary bracket having a vertical slot formed in a vertically positioned wall portion thereof, a screw pivotally connected for rotation in said bracket, a stud member having one end portion threadedly mounted for movement along said screw and having another opposite end portion protruding through the slot in said bracket and being operably connected for movement in an up or down direction in said vertically positioned slot formed in said wall portion depending on whether said screw is rotated in one direction or the other, a cam lever in contact at one end with said stud member and pivotally connected to said bracket to rotate in a clockwise or counter-clockwise direction in a horizontal plane depending on whether the screw is moving the stud member in an up or down direction in said slot and a lug means connected to the other end of said cam lever to apply minute changes in tension to one end of a zero adjusting spring connected therewith when the position of said stud member is altered from one position in said slot to another by the rotation of said screw.

References Cited in the file of this patent

UNITED STATES PATENTS

| | | |
|---|---|---|
| 2,162,308 | Jenny | June 13, 1939 |
| 2,325,345 | Tate | July 27, 1943 |
| 2,387,909 | Ingham | Oct. 30, 1945 |

FOREIGN PATENTS

| | | |
|---|---|---|
| 557,732 | Germany | Aug. 27, 1932 |